US012624584B1

(12) United States Patent
Timothy

(10) Patent No.: US 12,624,584 B1
(45) Date of Patent: May 12, 2026

(54) SELF-CLOSING ADJUSTABLE TENSION SPRING HINGE

(71) Applicant: E. Erik Timothy, Apollo Beach, FL (US)

(72) Inventor: E. Erik Timothy, Apollo Beach, FL (US)

(73) Assignee: NATIONWIDE INDUSTRIES, INC, Tampa, FL (US)

( * ) Notice: Subject to any disclaimer, the term of this patent is extended or adjusted under 35 U.S.C. 154(b) by 260 days.

(21) Appl. No.: 17/803,255

(22) Filed: Apr. 4, 2022

(51) Int. Cl.
*E05F 1/08* (2006.01)
*E05F 1/12* (2006.01)

(52) U.S. Cl.
CPC ......... *E05F 1/1223* (2013.01); *E05Y 2201/41* (2013.01); *E05Y 2201/499* (2024.05); *E05Y 2900/132* (2013.01); *E05Y 2900/402* (2013.01)

(58) Field of Classification Search
CPC ............... E05F 1/1223; E05Y 2201/41; E05Y 2201/492; E05Y 2900/132; E05Y 2900/402
See application file for complete search history.

(56) References Cited

U.S. PATENT DOCUMENTS 142,855 A * 9/1873 Joyce .................... E05F 1/1215 16/300
822,911 A * 6/1906 Bommer ................. E05D 13/12 16/256
2,027,094 A * 1/1936 Downs ................... C10K 1/105 95/91
2,200,865 A * 5/1940 Stannard ................... E05F 3/20 16/54
2,203,197 A * 6/1940 Henry ................... E05F 1/1223 16/50
2,493,115 A * 1/1950 Diebel ...................... E05F 3/20 16/76
2,520,616 A * 8/1950 Wasson ................. E05F 1/1215 16/300
2,641,794 A * 6/1953 Raskin .................. E05F 1/1215 16/244
3,380,109 A * 4/1968 Ruiz ......................... E05F 3/20 16/50
3,510,986 A * 5/1970 Berkowitz .............. E05D 7/081 16/256
3,965,533 A * 6/1976 Frohlich ............... E05F 1/1215 16/72
4,073,038 A * 2/1978 Curry .................... E05F 1/1215 16/50
4,102,013 A * 7/1978 Newlon .................. E05D 5/128 16/222
4,419,788 A * 12/1983 Prout .................... E05F 1/1215 16/300
4,583,262 A * 4/1986 Werner ................. E05F 1/1215 16/300
5,048,155 A * 9/1991 Hwang ................. E05F 1/1215 16/301

(Continued)

*Primary Examiner* — Chuck Y Mah
(74) *Attorney, Agent, or Firm* — Arthur W. Fisher, III

(57) ABSTRACT

A self-closing adjustable tension spring hinge to close a gate or door without manual assistance from a person including a spring hinge disposed within a hinge housing and mounted between a bracket and mounting bracket by an upper bearing assembly and upper spring coupler, and a lower bearing assembly and lower spring coupler respectively.

24 Claims, 8 Drawing Sheets

(56) References Cited

U.S. PATENT DOCUMENTS

| | | | | |
|---|---|---|---|---|
| 5,383,253 | A * | 1/1995 | Lin | E05F 3/20 16/300 |
| 6,658,694 | B2 * | 12/2003 | Wang | E05F 1/1223 16/284 |
| 7,743,465 | B2 * | 6/2010 | Lin | F16F 9/12 16/303 |
| 8,370,994 | B2 * | 2/2013 | Duan | G06F 1/1681 16/303 |
| 8,516,657 | B2 * | 8/2013 | Yoshida | A47K 13/12 188/293 |
| 8,898,860 | B2 * | 12/2014 | Bacchetti | E05F 3/20 16/303 |
| 10,626,651 | B2 * | 4/2020 | Chang | E05F 3/20 |
| 11,091,946 | B2 * | 8/2021 | Wu | E05D 3/022 |
| 2003/0014839 | A1 * | 1/2003 | Wu | E05F 1/1215 16/298 |
| 2003/0051313 | A1 * | 3/2003 | Wu | E05F 1/1215 16/298 |
| 2006/0130276 | A1 * | 6/2006 | Clark | E05D 5/06 16/299 |
| 2007/0000090 | A1 * | 1/2007 | Wu | E05F 1/1215 16/299 |
| 2011/0072618 | A1 * | 3/2011 | Chen | E05F 1/1215 16/303 |
| 2011/0185536 | A1 * | 8/2011 | Costabel | E05F 1/1207 16/2.1 |
| 2011/0239406 | A1 * | 10/2011 | Macernis | E05F 1/1215 16/354 |
| 2011/0302743 | A1 * | 12/2011 | Kim | E05F 1/1215 16/248 |
| 2014/0033476 | A1 * | 2/2014 | Bacchetti | E05F 3/20 16/52 |

* cited by examiner

SELF-CLOSING ADJUSTABLE TENSION SPRING HINGE

BACKGROUND OF THE INVENTION

Field of the Invention

A self-closing adjustable tension spring door/gate hinge.

Description of the Prior Art

Self-closing door hinges work are typically actuated or powered by an internal spring attached to a door and a door frame. Such hinges generally use spring tension to automatically close doors rather than relying on the user to manually close the door. The tension of spring hinges is often adjustable to preclude the door from closing too slowly, too fast or not completely close.

U.S. Pat. No. 4,845,810 discloses a self-closing hinge having a single unitary spring element to maintain the hinge in the open position and to move the hinge to the fully closed position after the hinge is partially closed.

U.S. Pat. No. 5,604,956 relates to a self-closing hinge comprising a hinge arm fastened to a hinge cup and an elastic element coupled to the hinge arm and disposed outside the hinge cup.

U.S. Pat. No. 4,287,641 describes a door hinge configured to urge a door to the closed position and to hold the door closed without the necessity of a latch mechanism. The hinge comprises a hinge member having an integral hinge pin portion formed thereon, a second hinge member having hinge portions rotatably mounted on the hinge pin, and a pressure member mounted on the second hinge member and reacting against the first hinge member to urge the door to a closed position wherein the pressure member operable retains the hinge members fully assembled.

U.S. Pat. No. 3,613,151 teaches a hinge construction providing a self-closing mechanism comprising a cabinet hinge wing and a door hinge wing connected by a hinge pin. The cabinet hinge wing includes a housing to accommodate springs pressing on the door hinge wing.

DE 36 01 682 A1 discloses a hinge construction comprising a hinge cup and a hinge arm attached thereto. Disposed inside the hinge cup is an elastic means touching the hinge arm. In order to fix the elastic means, a further holding means is necessary.

While some of the prior art may contain some similarities relating to the present invention, none of them teach, suggested or include all of the advantages and unique features of the invention disclosed hereafter.

SUMMARY OF THE INVENTION

The present invention relates to a self-closing adjustable tension spring hinge to close a gate or door without manual assistance from a person. The self-closing adjustable tension spring hinge is rotatably mounted or attached to a fence post or door jamb by a bracket or yoke and secured to a gate or door by a mounting bracket or connecting member.

The bracket or yoke comprises an upper mounting plate and a lower mounting plate coupled or connected by an interconnecting member to rotatably mount the self-closing adjustable tension spring hinge therebetween on a pivot rod or member.

The self-closing adjustable tension spring hinge comprises an upper bearing assembly at least partially disposed within the upper portion of a hinge housing, a spring assembly disposed within the mid-portion of the hinge housing and a lower bearing assembly at least partially disposed within a lower portion of the hinge housing.

The upper bearing assembly comprises an upper bearing and an upper ball bearing; while, the lower bearing assembly comprises a lower bearing and lower ball bearing.

The spring assembly comprises an upper spring connector or coupler and a lower spring connector or coupler to connect or couple a tension spring to the upper bearing assembly and to the lower bearing assembly respectively.

The upper bearing includes an upper interlocking mechanism that extends downwardly therefrom to engage a lower interlocking mechanism that extends upwardly from the upper spring connector or coupler to interlock the upper bearing and the upper spring connector or coupler together to prevent rotation therebetween. The outer surface of the upper ball bearing disposed within the hinge housing engages an upper portion of the interior wall of the hinge housing; while, the upper interlocking mechanism and the lower interlocking mechanism engage the inner surface of the upper ball bearing.

A limit pin extends downwardly from the upper bearing and is disposed within a track formed in the upper surface of the hinge housing to limit rotation of the hinge housing relative to the bracket or yoke is limited by engagement of the limit pin with a stop or stop surface formed at each end of the track.

The lower bearing includes a base having a post extending upwardly therefrom into a hole or aperture formed in the lower ball bearing disposed within the lower portion of the hinge housing to engage the inner surface of the lower ball bearing; while, the outer surface of the lower ball bearing engages the interior surface of the hinge housing. This facilitates rotation of the hinge housing on the mounting bracket when opening or closing the gate or door.

The tension spring has an upper retainer extending upwardly from the upper portion thereof and a lower retainer extending downwardly from the lower portion thereof to couple the tension spring to the upper bearing and the lower bearing respectively.

The self-closing adjustable tension spring hinge may further include a structure to adjust the closing force of the tension spring.

This Summary is not intended to describe essential features of the claimed subject matter nor is it intended to limit the scope of the claimed subject matter. To the contrary, this Summary merely outlines various concepts and features that are developed in the Detailed Description.

BRIEF DESCRIPTION OF THE DRAWINGS

For a fuller understanding of the nature and object of the invention, reference should be had to the following detailed description taken in connection with the accompanying drawings in which.

Similar reference characters refer to similar parts throughout the several views of the drawings.

DETAILED DESCRIPTION OF THE INVENTION

Figure 1:
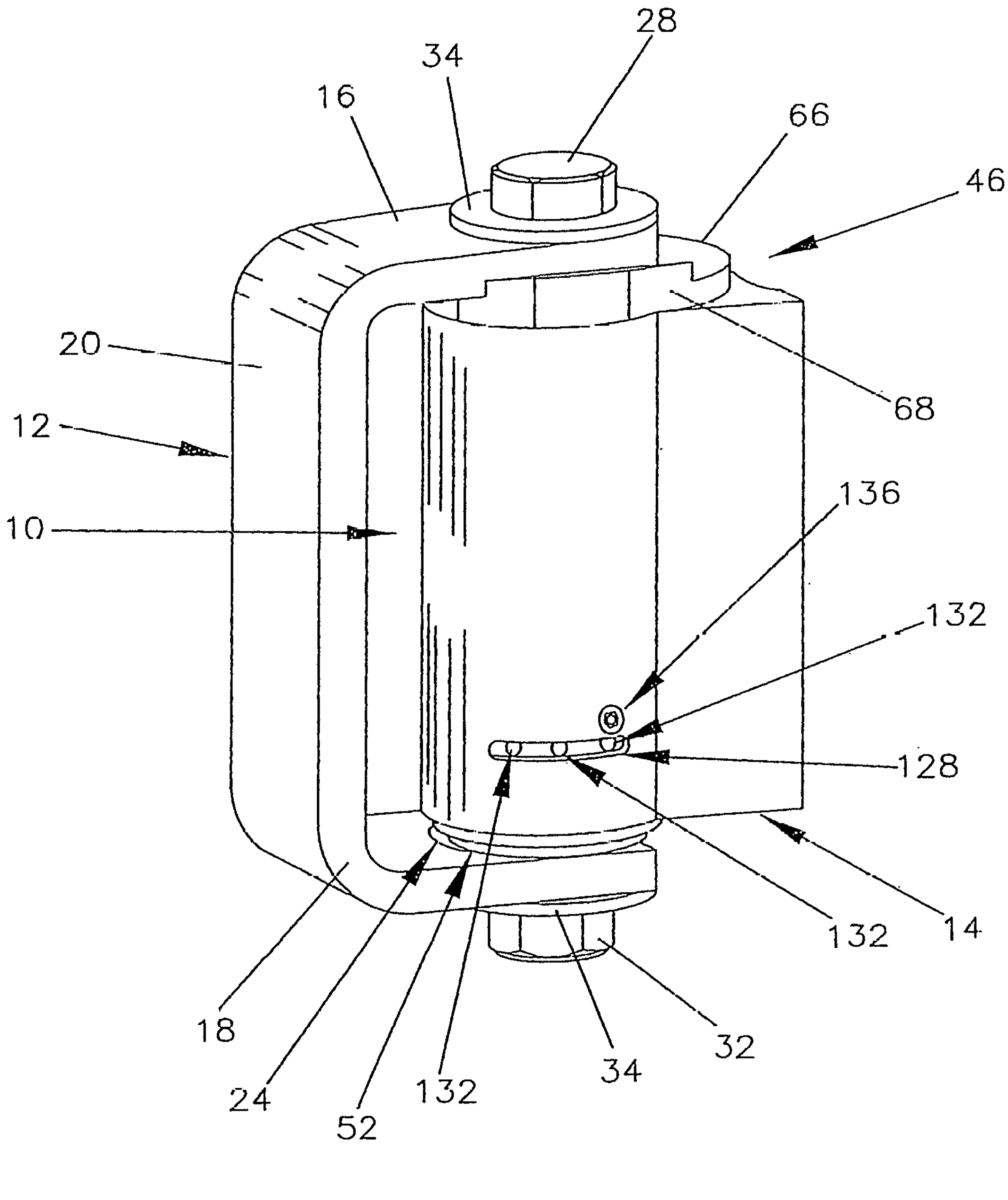
FIG. 1 is a perspective view of the self-closing adjustable tension spring hinge of the present invention.
Figure 2:
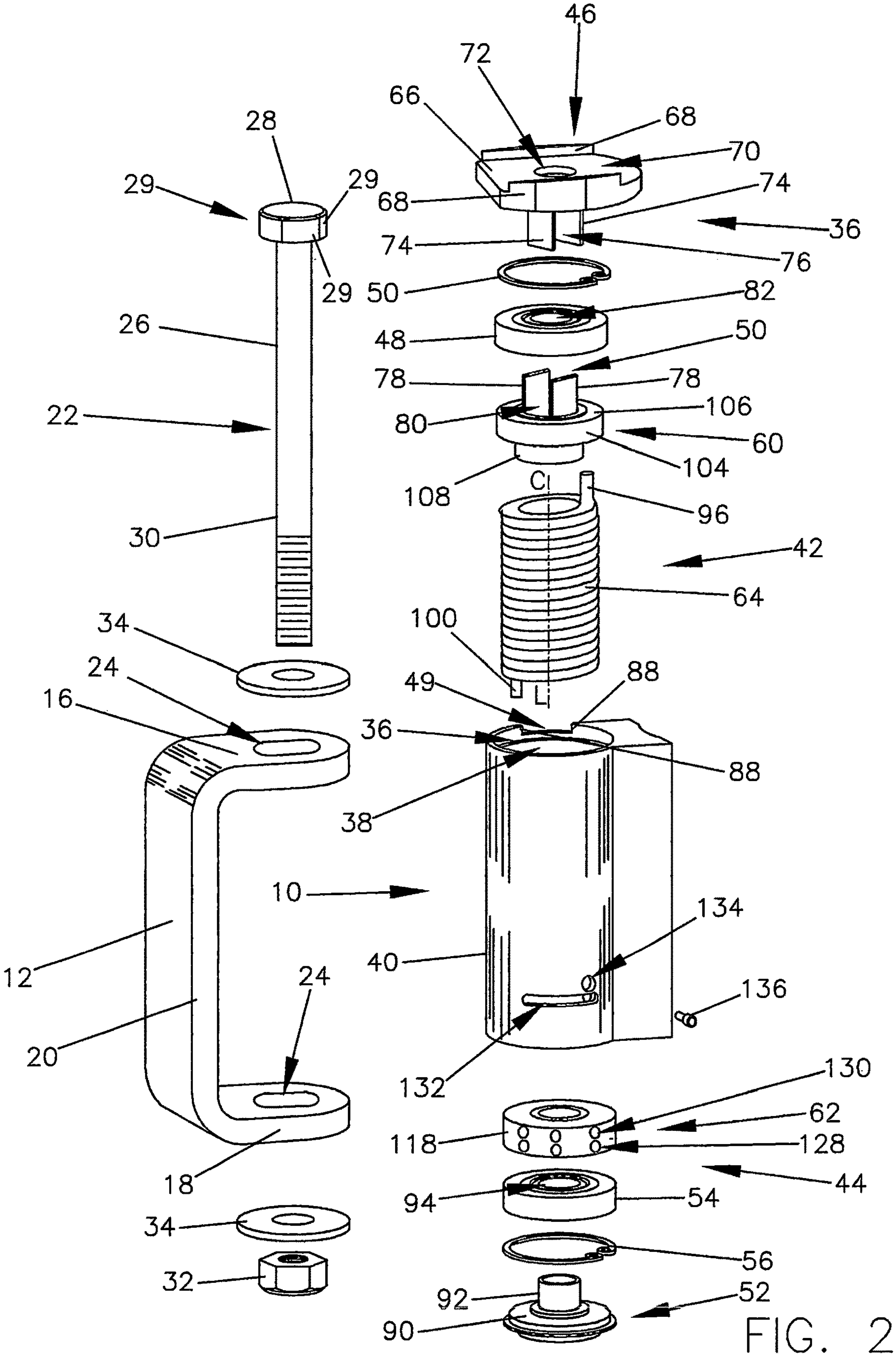
FIG. 2 is an exploded view of the self-closing adjustable tension spring hinge of the present invention.
Figure 3:
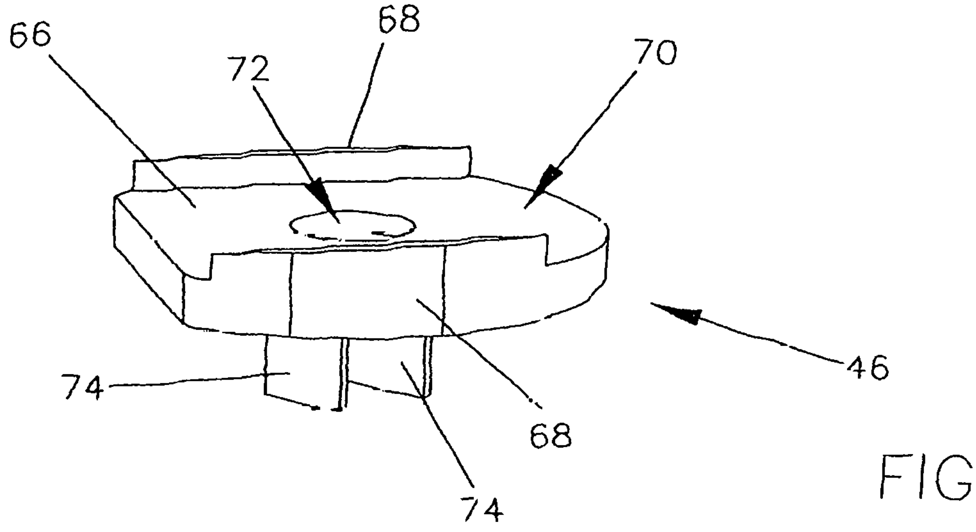
FIG. 3 is a top perspective view of the upper bearing of the present invention.

As shown in FIGS. 1 and 2, the present invention relates to a self-closing adjustable tension spring hinge generally indicated as 10 to close a gate or door (not shown) without manual assistance from a person. The self-closing adjustable tension spring hinge 10 is rotatably mounted or attached to a fence post or door jamb (not shown) by a substantially U-shaped bracket or yoke generally indicated as 12 and secured to a gate or door (not shown) by a mounting bracket or connecting member.

Figure 10:
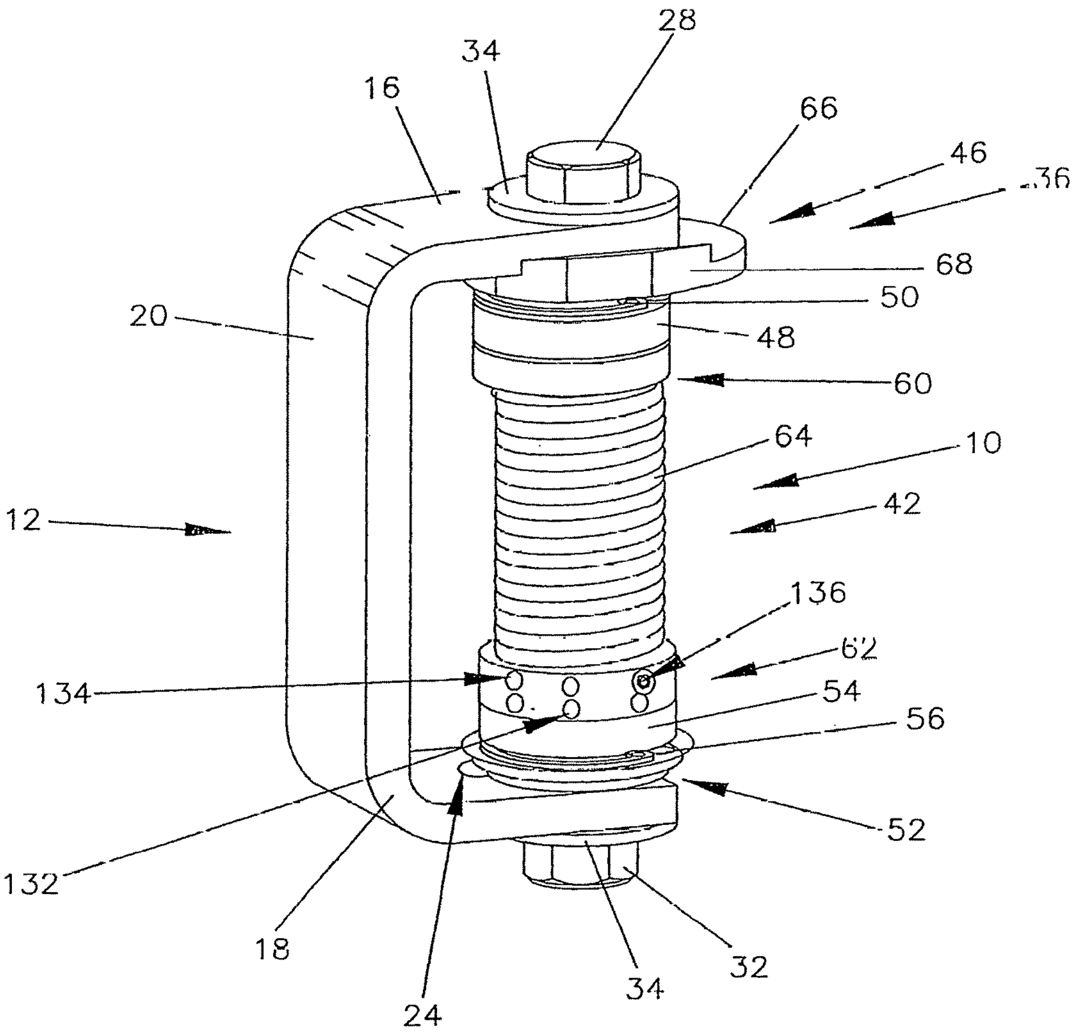
FIG. 10 is a perspective view of the present invention without the spring housing.

As shown in FIGS. 1, 2 and 10, the substantially U-shaped bracket or yoke 12 comprises an upper mounting plate or member 16 and a lower mounting plate or member 18 coupled or connected by an interconnecting member 20 to rotatably mount the self-closing adjustable tension spring hinge 10 therebetween on a pivot rod or member 22 such as a bolt passing through oblong holes or slots 24 formed through both the upper mounting plate or member 16 and the lower mounting plate or member 18. The upper end portion 26 of the pivot rod or member 22 includes an enlarged head 28 and the lower end portion 30 of the pivot rod or member 22 is threaded to receive a fastener 32 such as a nut to secure the pivot rod or member 22 to the substantially U-shaped bracket or yoke 12. A washer 34 is sandwiched between the enlarged head 28 of the pivot rod or member 22 and the upper surface of the upper mounting plate or member 16, and between the fastener 32 and the lower surface of the lower mounting plate or member 18.

The oblong holes or slots 24 formed through the upper mounting plate or member 16 and the lower mounting plate or member 18 allows for horizontal adjustment of the self-closing adjustable tension spring hinge 10 and the substantially U-shaped bracket or yoke 12.

As best shown in FIG. 2, the self-closing adjustable tension spring hinge 10 comprises an upper bearing assembly generally indicated as 36 at least partially disposed within the upper portion of a central channel 38 formed through a hinge housing 40, a spring assembly generally indicated as 42 disposed in the mid-portion of the central channel 38 of the hinge housing 40 and a lower bearing assembly generally indicated as 44 at least partially disposed within a lower portion of the central channel 38 of the hinge housing 40.

As best shown in FIGS. 2 and 10, the upper bearing assembly 36 comprises an upper bearing generally indicated as 46, an upper ball bearing 48 and an upper retainer ring 50; while, the lower bearing assembly 44 comprises a lower bearing generally indicated as 52, a lower ball bearing 54 and a lower retainer ring 56.

The upper bearing 46 engages the inner race of the upper ball bearing 48; while, the lower bearing 52 engages the inner race of the lower ball bearing 54.

As best shown in FIGS. 2 and 10, the spring assembly 42 comprises an upper spring connector or coupler generally indicated as 60 and a lower spring connector or coupler generally indicated as 62 to connect or couple a tension spring 64 to the upper bearing assembly 36 and to the lower bearing assembly 44 respectively as described hereinafter.

As shown in FIGS. 1 through 4 and 10, the upper bearing 46 comprises a substantially flat member 66 having a pair of limits or stops each indicated as 68 formed on the upper surface thereof to cooperatively form a slot or channel 70 to receive the upper mounting plate or member 16 of the substantially U-shaped bracket or yoke 12 therein to prevent rotation of the upper bearing 46 relative to the substantially U-shaped bracket or yoke 12, a central hole or aperture 72 formed through the substantially flat member 66 to receive the pivot rod or member 22 therethrough, an upper interlocking mechanism including a pair of spaced apart coupling or interlocking legs or protrusions each indicated as 74 extending downwardly from the substantially flat member 66 to form a pair of slots 76 therebetween to cooperatively engage a corresponding lower interlocking mechanism including pair of spaced apart coupling or interlocking legs or protrusions each indicated as 78 extending upwardly from the upper spring connector 60 to form a pair of slots or channels 80 therebetween to interlock the upper bearing 46 and the upper spring connector or coupler 60 together to prevent rotation therebetween. The coupling or interlocking legs or protrusions 74 and the coupling or interlocking legs or protrusions 78 are arcuate in shape or configuration having convex outer surfaces to be disposed within an aperture or hole 82 formed in the upper ball bearing 48 that is held or retained in place in a groove 49 formed in the upper end of the hinge housing 40 by the upper retainer ring 50. The outer surface of the upper ball bearing 48 disposed within the hinge housing 40 engages the upper portion of the interior wall of the hinge housing 40.

When the self-closing adjustable tension spring hinge 10 is assembled a portion of the pivot rod or member 22 extends through the aperture or hole 82 formed through of the upper ball bearing 48. The center-line of the slots or channels 70 are disposed at a substantially ninety degree angle relative to the center-line of the slots or channels 80 such that the four coupling or interlocking legs or protrusions 74 and 78 interlock with each other and cooperatively form a substantially three hundred and sixty degree convex surface to engage the inner surface of the upper ball bearing 48 formed around the aperture or hole 82.

Figure 4:
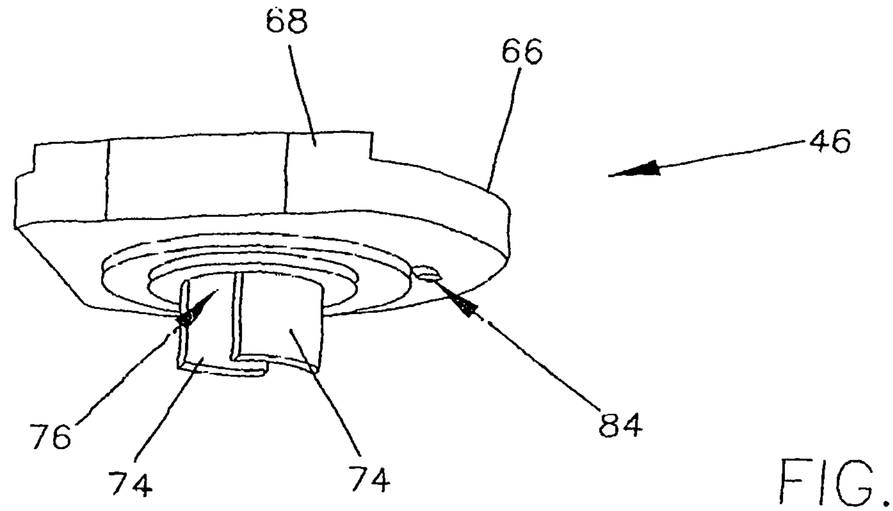
FIG. 4 is a bottom perspective view of the upper bearing of the present invention.
Figure 9:
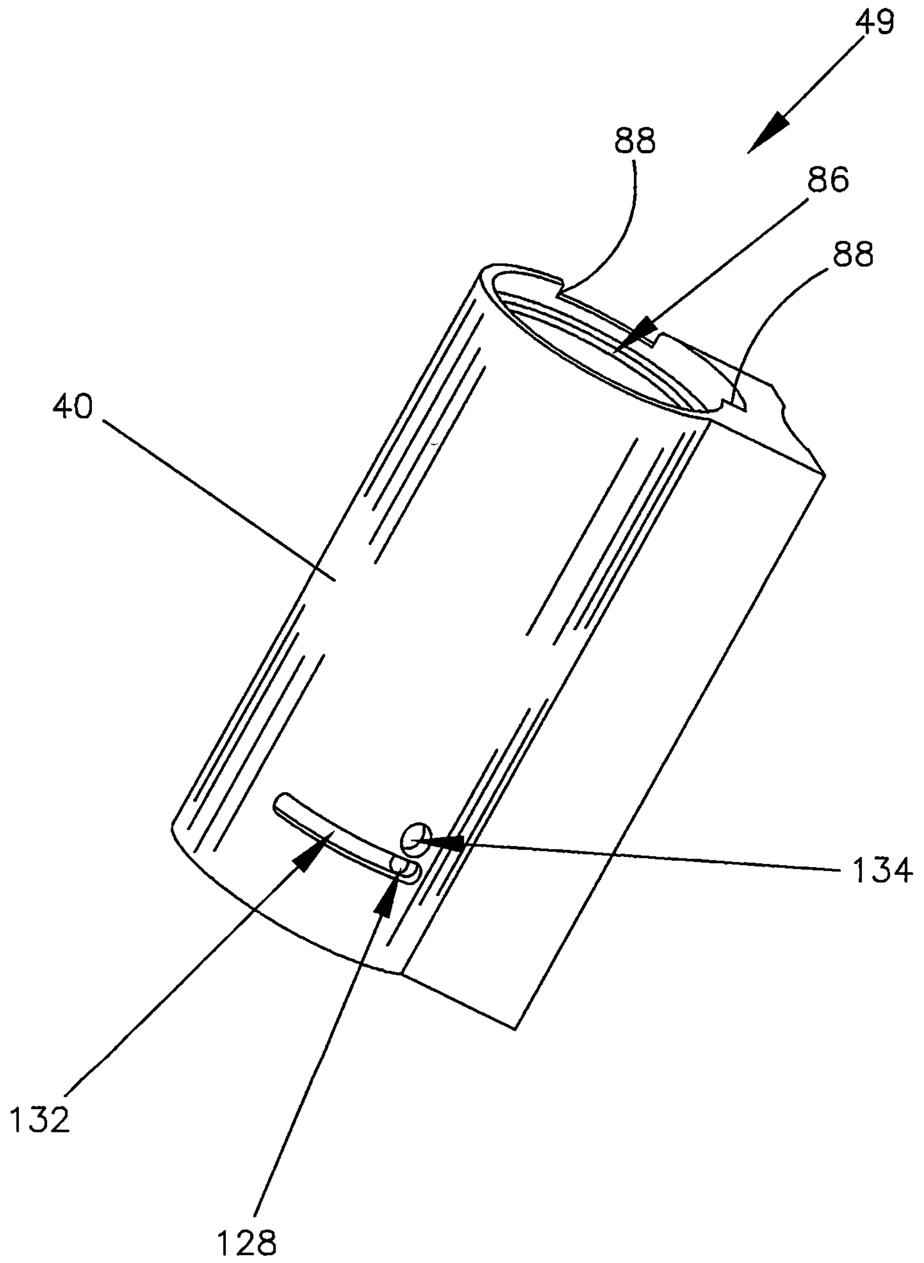
FIG. 9 is a perspective view of the spring housing of the present invention.

As shown in FIGS. 2, 4 and 9, a limit pin 84 extends downwardly from the substantially flat member 66 and is disposed within a track 86 formed in the upper surface of the hinge housing 40 such that rotation of the hinge housing 40 relative to the substantially U-shaped bracket or yoke 12 is limited by engagement of the limit pin 84 with a stop or stop surface 88 formed at each end of the track 86.

Figure 8:
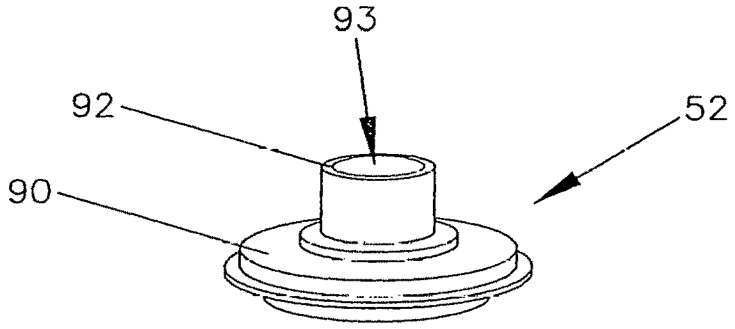
FIG. 8 is a top perspective view of the lower bearing of the present invention.

As shown in FIGS. 2 and 8, the lower bearing 52 comprises a base 90 having a centrally disposed post 92 extending upwardly therefrom and into a hole or aperture 94 formed in the lower ball bearing 54 held or retained in place within the lower portion of the hinge housing 40 by the lower retainer ring 56 in a groove (not visible) formed in the lower end of the hinge housing 40. The outer wall or surface of the lower ball bearing 54 disposed within the hinge housing 40 engages the lower portion of the interior wall of the hinge housing 40. This allows rotation of the hinge housing 40 and the mounting bracket 14 having the gate or door (not shown) mounted thereto to open and close the gate or door (not shown).

Figure 6:
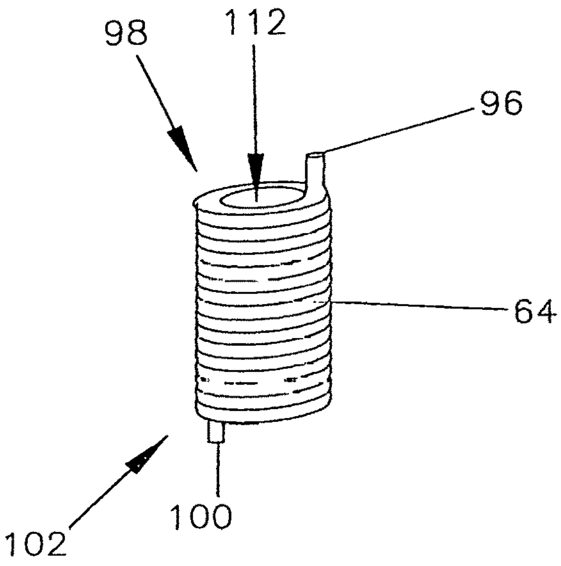
FIG. 6 is a perspective view of the spring of the present invention.

As best shown in FIGS. 2 and 6, the tension spring 64 has an upper retainer or coupler pin or peg 96 extending upwardly from the upper portion 98 thereof and a lower retainer or coupler pin or peg 100 extending downwardly from the lower portion thereof to engage the upper spring connector or coupler 60 and the lower spring connector or coupler 62 respectively as described hereinafter. The center lines of the upper retainer or coupler pin or peg 96 and the lower retainer or coupler pin or peg 100 are substantially parallel to the center line CL of the tension spring 64.

Figure 5:
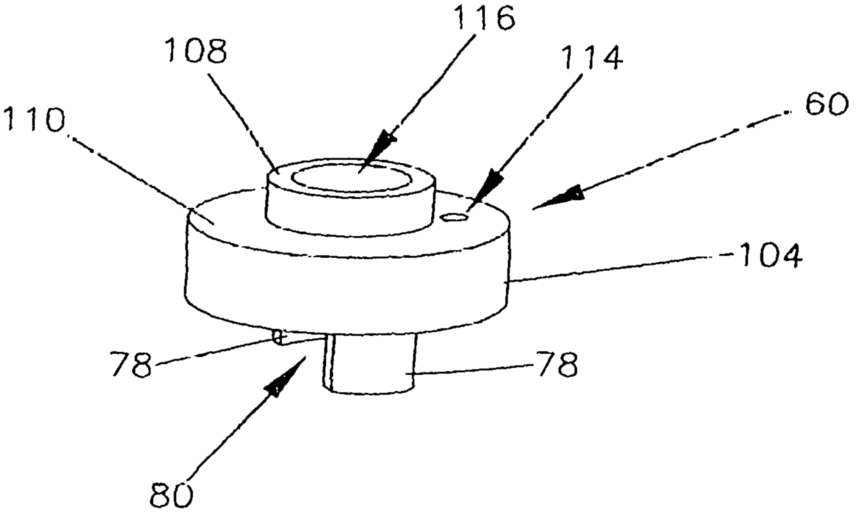
FIG. 5 is a bottom perspective view of the upper spring coupler of the present invention.

As best shown in FIGS. 2 and 5, the upper spring connector or coupler 60 comprises a substantially circular or round enlarged upper coupler member or base 104 including the pair of spaced apart coupling or interlocking legs or protrusions 78 extending upwardly from the top or upper surface 106 thereof and a substantially circular or round reduced upper alignment member 108 extending downwardly from the bottom or lower surface 110 thereof and disposed within the upper end portion of the central channel 112 (FIG. 6) of the tension spring 64 when assembled. As shown in FIG. 5, an upper retainer or coupler aperture or hole 114 is formed in the bottom or lower surface 110 of the substantially circular or round enlarged upper coupler member or base 104 of the upper spring connector or coupler 60 to receive the upper retainer or coupler pin or peg 96 of the tension spring 64. A central hole or aperture 116 is formed through the upper spring connector or coupler 60 to receive a portion of the pivot rod or member 22 therethrough.

When the self-closing adjustable tension spring hinge 10 is assembled, the upper portion of the tension spring 64 is coupled or interlocked to the pivot rod or member 22. Specifically, engagement of the flat surfaces 29 of the enlarged head 28 of the pivot rod or member 22 with the limits or stops 68 of the upper bearing 46, engagement of the spaced apart coupling or interlocking legs or protrusions 74 of the upper bearing 46 with the spaced apart coupling or interlocking legs or protrusions 78 of the upper spring connector or coupler 60 and engagement of the upper retainer or coupler pin or peg 96 of the tension spring 64 with the upper retainer or coupler aperture or hole 114 of the upper spring connector or coupler 60.

Figure 7:
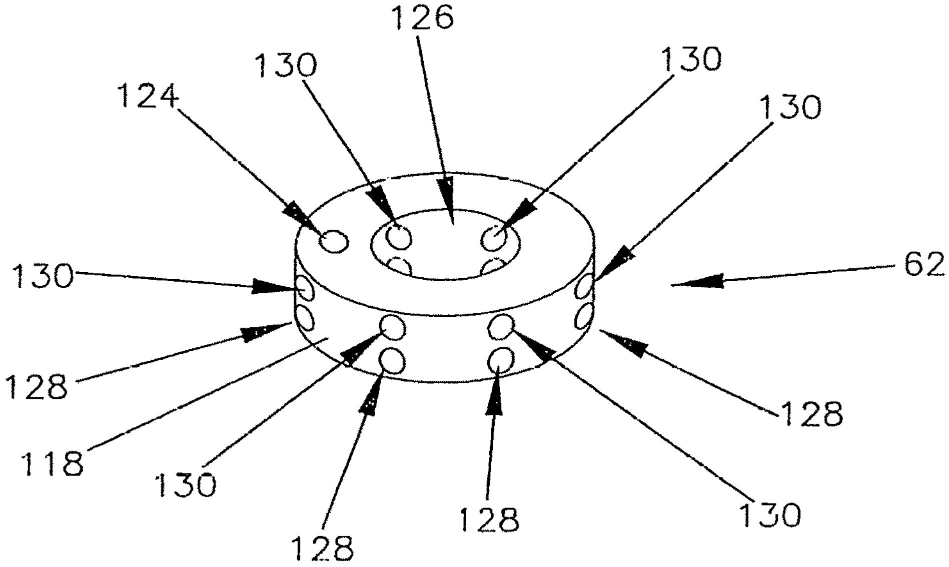
FIG. 7 is a top perspective view of the lower spring coupler of the present invention.

As best shown in FIGS. 2 and 7, the lower spring connector or coupler 62 comprises a substantially circular or round lower member or coupler base 118 disposed within the lower end portion of the hinge housing 14 when assembled. A lower retainer or coupler aperture or hole 124 is formed in the top or upper surface 122 of the substantially circular or round lower coupler member or base 118 to receive the lower retainer or coupler pin or post 100 of the tension spring 64. A central hole or channel 126 is formed through the lower spring connector or coupler 62 to receive a portion of the pivot rod or member 22 therethrough.

As shown in FIGS. 1, 2, 7 and 9, the self-closing adjustable tension spring hinge further includes a structure to selectively adjust the tension of the tension spring 64 to adjust the closing force of the self-closing adjustable tension gate/door hinge 10. Specifically, at least one but preferably a plurality of adjustment holes each indicated as and at least one but preferably a plurality of threaded anchor or securing channels or recesses each indicated as 130 are formed in the circumference 131 of the substantially circular or round lower coupler member or base 118.

The adjustment slot 132 and the adjustment hole(s) 128 are disposed in substantially the same horizontal plane; while, the anchoring or securing hole 134 and the threaded anchor or securing channel(s) or recess(es) 130 are disposed in substantially the same horizonal plane.

The adjustment hole(s) 128 is/are visible through an adjustment slot 132 formed through the lower portion of the hinge housing 40; while the threaded anchor or securing channel(s) or recess(es) 130 is/are visible through an anchoring or securing hole 134.

The plurality of adjustment holes 128 and the plurality of threaded anchor or securing channels or recesses 130 are formed in at least a portion of the circumference of the lower coupler member or base 118 or over the entire circumference of the lower coupler member or base 118. Since the lower retainer or coupler pin or peg 100 of the tension spring 64 is secured to the lower spring connector or coupler 62 rotation of the lower spring connector or coupler 62 by inserting a tool (not shown) through the adjustment slot 132 and into a selected adjustment hole(s) 128 the tension of the tension spring 64 is increased or decreased depending upon the direction of rotation of the lower spring connector or coupler 62. The lower spring connector or coupler 62 and the hinge housing 40 are then secured together by placing a set screw 136 through the anchoring or securing hole(s) 134 and into the selected threaded anchoring or securing channel or recess 130 aligned with the corresponding anchoring or securing hole 134.

Figure 11:
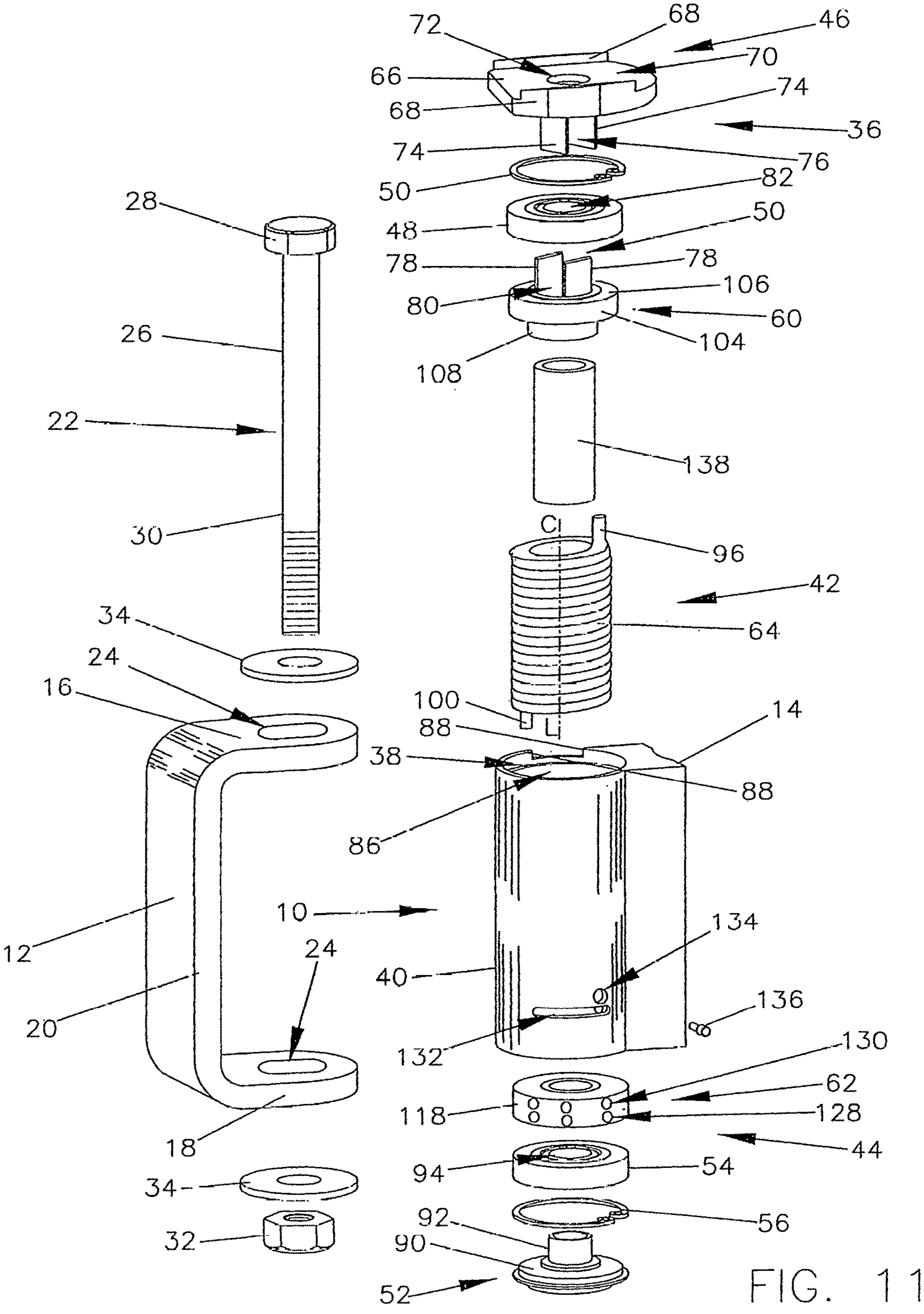
FIG. 11 is an exploded view of an alternate embodiment of the self-closing adjustable tension spring hinge of the present invention.
Figure 12:
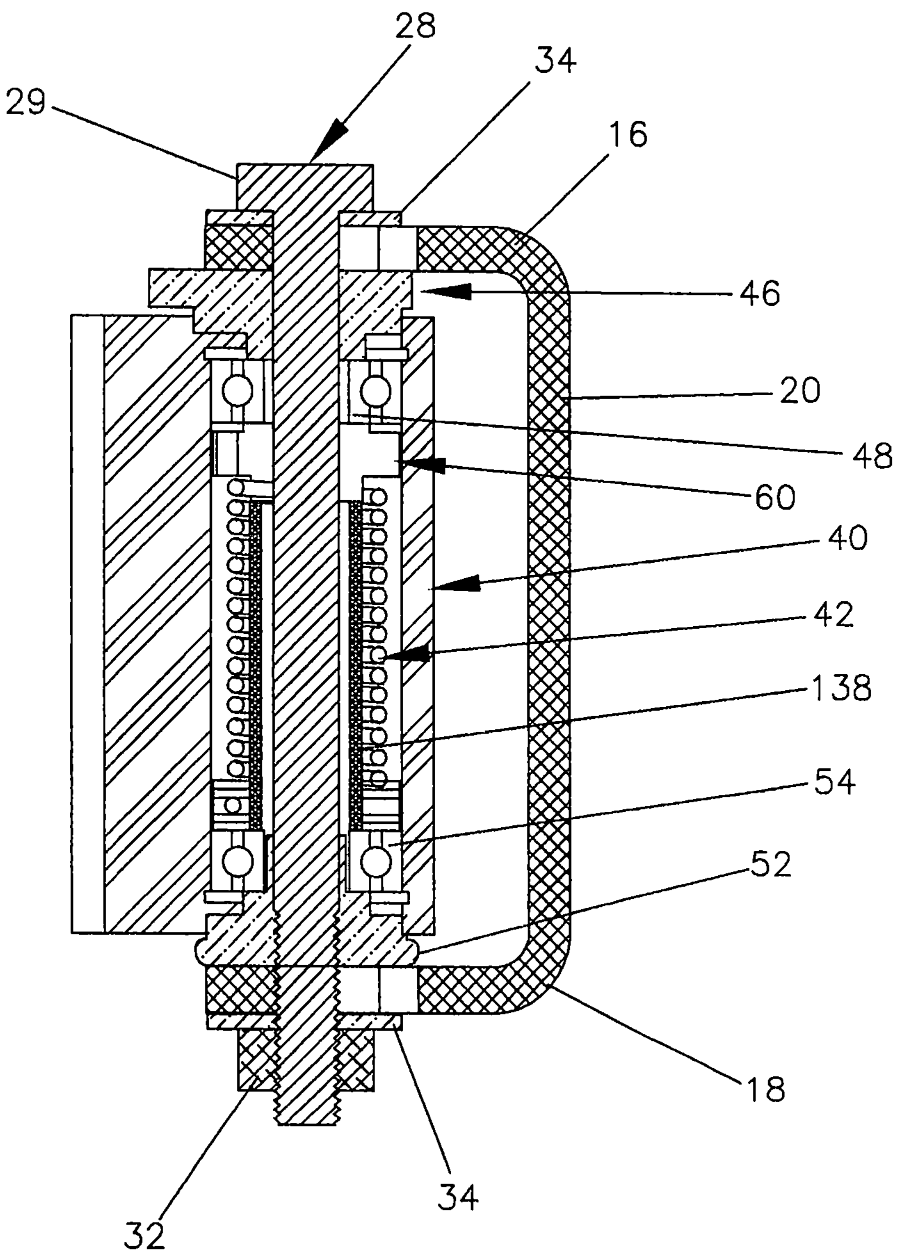
FIG. 12 is a cross-sectional side view of the alternate embodiment of the self-closing adjustable tension spring hinge of the present invention depicted in FIG. 11.

FIG. 11 discloses an alternate embodiment of the self-closing adjustable tension spring hinge 10. Structural components similar to those depicted in FIGS. 1 through 10 are designated with identical numbers with the addition of an internal support. The internal support comprises a cylindrical tube or sleeve 138 at least partially disposed within the tension spring 64 to engage the lower surface of the substantially circular or round reduced upper alignment member 108 of the upper spring connector or coupler 60 and the upper surface of the lower ball bearing 54 of the lower bearing assembly 44 that together with the upper bearing assembly 36, upper spring connector or coupler 60 and the lower bearing assembly 44 comprise a column or support structure between the upper mounting plate or member 16 and the lower mounting plate or member 18 of the bracket 12 to prevent the tension spring 64 from collapsing when the self-closing adjustable tension spring hinge 10 is secured to the substantially U-shaped bracket or yoke 12 when tightening the pivot rod or member 22 and fastener 32.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

In describing the invention, certain terms are used for brevity, clarity, and understanding. No unnecessary limitations should be inferred beyond the requirement of the prior art because such terms are used for descriptive purposes and are intended to be broadly construed. The different structural and functional elements, apparatuses, devices, compositions, and methods described herein may be used alone or in combination with other structural and functional elements, apparatuses, devices, compositions, systems and methods. It is to be expected that various equivalents, alternatives and modifications are possible within the scope of the claims hereinafter.

Now that the invention has been described,

What is claimed is:

1. A self-closing adjustable tension spring hinge to close a gate or door without manual assistance from a person including a spring assembly including a tension spring disposed between an upper spring coupler and a lower spring coupler, said hinge housing having an interior wall and including an upper portion, a mid-portion and a lower portion rotatably mounted on a gate post or door jamb, by a bracket by an upper bearing assembly and an upper spring coupler to couple said tension spring to said upper bearing assembly, and a lower bearing assembly and a lower spring coupler to couple said tension spring to said lower bearing assembly said bracket comprises an upper mounting member and a lower mounting member connected by an interconnecting member to rotatably mount said self-closing adjustable tension spring hinge said self-closing adjustable spring hinge mounted to a gate post or door jamb by a rod extending through said spring assembly and said hinge housing disposed between an upper mounting member and a lower mounting member held in spaced relationship relative to each other by an interconnecting member wherein an upper bearing assembly is disposed between said upper mounting member and said upper portion of said hinge housing and a lower bearing assembly is disposed between said lower mounting member and said lower portion of said hinge housing, wherein said upper bearing assembly comprises an upper bearing at least partially disposed within said upper portion of a said hinge housing, said lower bearing assembly comprises a lower bearing at least partially disposed within said lower portion of said hinge housing and said spring assembly comprises said tension spring including an upper portion and a lower portion formed on opposite ends thereof disposed within said mid-portion of said hinge housing, an upper coupler pin formed on an upper portion of said tension spring and a lower coupler pin formed on a lower portion of said tension spring to couple said tension spring to said upper spring coupler and to said lower spring coupler respectively, said upper bearing comprises at least one stop to engage said upper mounting member of said bracket to prevent rotation of said upper bearing relative to said bracket, said upper bearing further includes an upper interlocking mechanism and said upper spring coupler further includes a lower interlocking mechanism disposed to engage said upper interlocking mechanism to prevent rotation of said upper spring coupler relative to said upper bearing assembly.

2. The self-closing adjustable tension spring hinge of claim 1 wherein said upper bearing includes a pair of upper protrusions and said upper spring coupler includes a pair of lower protrusions disposed to engage said upper protrusion to couple said upper bearing and said upper spring coupler together to prevent rotation therebetween.

3. The self-closing adjustable tension spring hinge of claim 2 wherein said upper bearing assembly further comprises an upper ball bearing including an outer surface disposed to engage said upper portion of said interior wall of said hinge housing and a hole formed therethrough disposed within said hinge housing and disposed to engage said pair of upper protrusions and said pair of lower protrusions.

4. The self-closing adjustable tension spring hinge of claim 1 further including a limit pin extending downwardly from said upper bearing and said hinge housing further includes a track having a stop formed on each end of said track to selectively engage of said limit pin to limit rotation of said hinge housing relative to said bracket.

5. The self-closing adjustable tension spring hinge of claim 1 wherein said upper bearing assembly further comprises an upper ball bearing including an outer surface disposed to engage said upper portion of said interior wall of said hinge housing and a hole formed therethrough disposed to receive a portion of said upper bearing therethrough and said lower bearing assembly further comprises a lower ball bearing including an outer surface disposed to engage said lower portion of said interior wall of said hinge housing and a hole formed therethrough disposed to receive a portion of said lower bearing to allow rotation of said hinge housing.

6. The self-closing adjustable tension spring hinge of claim 1 wherein said hinge housing is rotatably mounted on said upper mounting member and said lower mounting member by a pivot rod.

7. A self-closing adjustable tension spring hinge to close a gate or door without manual assistance from a person including a spring assembly including a tension spring disposed within a hinge housing having an interior wall and including an upper portion, a mid-portion and a lower portion rotatably mounted on a gate post or door jamb by a bracket by an upper bearing assembly including an upper spring coupler and a lower bearing assembly including a lower spring coupler, said tension spring being coupled between said upper bearing assembly and said lower bearing assembly, said hinge housing includes an adjustment slot formed through said lower portion thereof and said lower spring coupler having at least one adjustment hole formed therein, said adjustment slot and said adjustment hole being disposed in substantially the same horizontal plane to selectively receive an adjustment tool through said adjustment slot and into said adjustment hole to rotate said lower spring coupler and said tension spring relative to said hinge housing and wherein said hinge housing further includes an anchor hole formed in said lower portion thereof and said lower spring coupler includes at least one anchoring hole formed therein disposed in substantially the same horizontal plane to selectively receive a set screw through said anchor hole formed in said hinge housing and into said anchoring hole of said lower spring coupler to adjust the closing force of said tension spring when said lower spring coupler and said tension spring are rotated by the adjustment tool to align said anchor hole formed in said hinge housing with said anchoring hole of said lower spring coupler.

8. The self-closing adjustable tension spring hinge of claim 7 wherein said upper bearing assembly further comprises an upper ball bearing including an outer surface disposed to engage said upper portion of said interior wall of said hinge housing and a hole formed therethrough disposed to receive a portion of said upper ball bearing therethrough and said lower bearing assembly further comprises a lower ball bearing including an outer surface disposed to engage said lower portion of said interior wall of said hinge housing and a hole formed therethrough disposed to receive a portion of said lower ball bearing to allow rotation of said hinge housing relative to said bracket.

9. The self-closing adjustable tension spring hinge of claim 7 wherein said lower spring coupler includes a plurality of said anchoring holes to provide a corresponding plurality of anchoring position.

10. The self-closing adjustable tension spring hinge of claim 9 wherein said lower spring coupler includes a plurality of adjustment holes to increase angular rotation of said lower spring coupler and tension spring through said adjustment slot.

11. A self-closing adjustable tension spring hinge to close a gate or door without manual assistance from a person including a spring assembly including a tension spring disposed within a hinge housing having an interior wall and including an upper portion, a mid-portion and a lower portion rotatably mounted on a gate post or door jamb by a bracket by an upper bearing assembly and an upper spring coupler including an alignment member extending downwardly therefrom and extending into said tension spring, and a lower bearing assembly and a lower spring coupler, further including an internal spring support comprises a tube disposed within said tension spring and extending between said upper portion of said hinge housing and said lower portion of said hinge housing to engage said alignment member and said lower spring coupler to limit vertical movement of said upper bearing assembly to prevent said tension spring from collapsing when said self-closing adjustable tension spring hinge is secured to said bracket.

12. A self-closing adjustable tension spring hinge to close a gate or door without manual assistance from a person including a spring assembly disposed within a hinge housing having an interior wall and including an upper portion, a mid-portion and a lower portion rotatably mounted on a gate post or door jamb by a bracket by an upper bearing assembly and a lower bearing, said bracket comprises an upper mounting member and a lower mounting member coupled by an interconnecting member to rotatably mount said self-closing adjustable tension spring hinge wherein said upper bearing assembly comprises an upper bearing at least partially disposed within said upper portion of said hinge housing, said lower bearing assembly comprises a lower bearing at least partially disposed within said lower portion thereof within said lower portion of said hinge housing and said spring assembly comprises a tension spring including an upper portion and a lower portion formed in opposite ends thereof disposed within said mid-portion of said hinge housing, an upper spring coupler pin is formed on the upper portion of said tension spring and a lower spring coupler pin is formed on the lower portion of said tension spring to couple said tension spring an upper spring coupler and a lower spring coupler wherein said upper bearing assembly further comprises a pair of legs extending downward to engage a pair of legs extending upward from said upper spring coupler to interlock said upper bearing assembly and said upper spring coupler.

13. The self-closing adjustable tension spring hinge of claim 12 further including a limit pin extending downwardly from said upper bearing and said hinge housing further includes a track having a stop formed on each end of said track to selectively engage of said limit pin to limit rotation of said hinge housing relative to said bracket.

14. The self-closing adjustable tension spring hinge of claim 13 wherein said tension spring comprises an upper coupler pin extending upwardly from said upper portion of said tension spring and a lower coupler pin extending downwardly from said lower portion of said tension spring to engage recesses formed in said upper spring coupler and said lower spring coupler respectively.

15. The self-closing adjustable tension spring hinge of claim 14 wherein said upper spring coupler comprises an upper substantially round enlarged coupling member and a substantially round reduced upper alignment member and extending downwardly from said upper substantially round enlarged coupler member being disposed within said upper end portion of said tension spring.

16. The self-closing adjustable tension spring hinge of claim 14 wherein said upper spring coupler further comprises an upper coupler member including an upper retainer hole to receive said upper coupler pin of said tension spring.

17. The self-closing adjustable tension spring hinge of claim 16 wherein said lower spring coupler comprises a lower member including an upper surface disposed within said lower portion of said hinge housing and a lower retainer hole is formed in said upper surface of said lower member to receive said lower coupler pin of said tension spring.

18. A self-closing adjustable tension spring hinge to close a gate or door without manual assistance from a person including a spring assembly disposed within a hinge housing, said hinge housing having an interior wall and including an upper portion, a mid-portion and a lower portion rotatably mounted on a gate post or door jamb by a bracket by an upper bearing assembly and an upper spring coupler, and a lower bearing assembly and a lower spring coupler, said bracket comprises an upper mounting member and a lower mounting member coupled by an interconnecting member to rotatably mount said self-closing adjustable tension spring hinge wherein said upper bearing assembly comprises an upper bearing at least partially disposed within said upper portion of a said hinge housing, said lower bearing assembly comprises a lower bearing at least partially disposed within said lower portion of said hinge housing and said spring assembly comprises a tension spring including an upper portion and a lower portion formed on opposite ends thereof disposed within said mid-portion of said hinge housing, an upper coupler pin formed on an upper portion of said tension spring and a lower coupler pin are formed on a lower portion of said tension spring to couple said tension spring to said upper bearing and to said lower bearing respectively, said hinge housing includes an adjustment slot and an adjustment hole formed in said lower portion thereof and said lower spring coupler includes at least one anchoring hole formed therein disposed in substantially the same horizontal plane as said anchor hole to selectively receive a set screw through and at least one adjustment hole to receive an adjustment tool therein to rotate said lower spring coupler to adjust the closing force of said tension spring when said lower spring coupler is rotated by the adjustment tool to align said anchor hole with said anchoring hole.

19. The self-closing adjustable tension spring hinge of claim 18 wherein said lower spring coupler includes a plurality of said anchoring holes to provide a corresponding plurality of anchoring positions.

20. The self-closing adjustable tension spring hinge of claim 19 wherein said lower spring includes a plurality of adjustment holes to change the angular rotation of said lower spring coupler through said slot.

21. The self-closing adjustable tension spring hinge of claim 20 wherein said lower spring coupler comprises a lower member including an upper surface disposed within said lower portion of said hinge housing and a lower retainer hole is formed in said upper surface of said lower member to receive said lower coupler pin of said tension spring.

22. The self-closing adjustable tension spring hinge of claim 21 wherein said upper bearing includes an upper interlocking mechanism and said upper spring coupler includes a lower interlocking mechanism disposed to engage said upper interlocking mechanism said upper bearing assembly further comprises an upper ball bearing including an outer surface disposed to engage upper portion of said interior wall of said hinge housing and a hole formed therethrough disposed to engage said upper locking mechanism and lower locking mechanism.

23. A self-closing adjustable tension spring hinge to close a gate or door without manual assistance from a person comprising a spring assembly including a tension spring having a central channel formed therein disposed within a hinge housing, said hinge housing having an interior wall and including an upper portion, a mid-portion and a lower portion rotatably mounted on a gate post or door jamb by a bracket by an upper bearing assembly comprising an upper spring coupler including an alignment member having a lower surface configured to be disposed within said central channel for said tension spring and a lower bearing assembly including a lower bearing, and further including an internal spring support comprises a tube disposed entirely within said tension spring to engage said lower surface of said alignment member inside said central channel and the upper surface of said lower bearing to limit compression of said tension spring from engaging said lower surface of said upper spring coupler when said self-closing adjustable tension spring hinge is secured to said bracket.

24. A self-closing adjustable tension spring hinge to close a gate or door without manual assistance from a person including a spring assembly disposed within a hinge housing having an interior wall and including an upper portion, a mid-portion and a lower portion rotatably mounted on a gate post or door jamb by a bracket by an upper bearing assembly and an upper spring coupler, and a lower bearing assembly and a lower spring coupler, said bracket comprises an upper mounting member and a lower mounting member coupled by an interconnecting member to rotatably mount said self-closing adjustable tension spring hinge wherein said upper bearing assembly comprises an upper bearing at least partially disposed within said upper portion of a said hinge housing, said lower bearing assembly comprises a lower bearing at least partially disposed within said lower portion of said hinge housing and said spring assembly comprises a tension spring including an upper portion and a lower portion formed on opposite ends thereof disposed within said mid-portion of said hinge housing, an upper coupler pin formed on an upper portion of said tension spring and a lower coupler pin formed on a lower portion of said tension spring to couple said tension spring to said upper spring coupler and to said lower spring coupler respectively wherein said upper bearing assembly further comprises an upper ball bearing including an outer surface disposed to engage said upper portion of said interior wall of said hinge housing and a hole formed therethrough disposed to engage said upper spring coupler and said lower bearing assembly further comprises a lower ball bearing including an outer surface disposed to engage said lower portion of said interior wall of said hinge housing and a hole formed therethrough and a lower bearing including a base having a post extending upwardly therefrom and into said hole formed in said lower ball bearing.

* * * * *